United States Patent
Roskopf (10) Patent No.: US 11,485,268 B2
(45) Date of Patent: Nov. 1, 2022

(54) TRANSPORTER HAVING LOWERABLE BED

(71) Applicant: Metalcraft of Mayville, Inc., Mayville, WI (US)

(72) Inventor: Dennis Roskopf, Beaver Dam, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 0 days.

(21) Appl. No.: 17/194,810

(22) Filed: Mar. 8, 2021

(65) Prior Publication Data

US 2021/0276474 A1   Sep. 9, 2021

Related U.S. Application Data

(60) Provisional application No. 62/987,166, filed on Mar. 9, 2020.

(51) Int. Cl.
| | |
|---|---|
| *B60P 1/43* | (2006.01) |
| *B62D 29/00* | (2006.01) |
| *B62D 33/02* | (2006.01) |

(52) U.S. Cl.
CPC ............. *B60P 1/435* (2013.01); *B60P 1/433* (2013.01); *B62D 29/007* (2013.01); *B62D 33/02* (2013.01)

(58) Field of Classification Search
CPC ........ B60P 1/435; B60P 1/433; B62D 29/007; B62D 33/02
See application file for complete search history.

(56) References Cited

U.S. PATENT DOCUMENTS

| | | | |
|---|---|---|---|
| 6,698,996 B2 | 3/2004 | Smith, Jr. | |
| 7,063,494 B2 | 6/2006 | Smith, Jr. | |
| 7,503,742 B2 | 3/2009 | Smith, Jr. | |
| 8,079,798 B2 * | 12/2011 | Smith | B66F 7/243 414/537 |
| 8,267,466 B1 | 9/2012 | Smith, Jr. et al. | |
| 10,000,145 B2 * | 6/2018 | Woods | F15B 15/10 |
| 2004/0239147 A1 * | 12/2004 | Fenton | B62D 33/04 296/186.1 |
| 2006/0099061 A1 * | 5/2006 | Smith | B60P 1/433 414/537 |

(Continued)

OTHER PUBLICATIONS

Mack Trucks, Jan. 30, 2020, 2 Pages, Saved on Jan. 14, 2022, https://www.macktrucks.com/mack-news/2020/mack-trucks-launches-mack-md-series-medium-duty-truck/.*

(Continued)

*Primary Examiner* — Saul Rodriguez
*Assistant Examiner* — Ashley K Romano
(74) *Attorney, Agent, or Firm* — Boyle Fredrickson S.C.

(57) ABSTRACT

A transporter includes a frame supported on wheels, a cab mounted on a front portion of the frame, and a bed mounted on the rear portion of the frame. The bed includes deck plates and supports mounting the deck plates on the frame. At least a rear end portion of the bed is raiseable and lowerable relative to the frame. The bed is sufficiently lightweight that the transporter has a hauling capacity of at least 10,000 lbs. and a fully loaded gross vehicle weight of no more than 26,000 lbs. At least portions of the bed may be made from high strength steel (HSS) such as ASTM A1011/ 1011M steel having a grade of 80 or higher. A ramp, which may also be made of HSS, may be attachable to the rear of the bed and may have longitudinally extending supports and slats that may be arranged in a herringbone pattern.

19 Claims, 10 Drawing Sheets

(56) References Cited

U.S. PATENT DOCUMENTS

2013/0094936 A1\* 4/2013 Hagenbuch ............. B60P 1/286
　　　　　　　　　　　　　　　　　　　　　　414/809
2013/0189059 A1\* 7/2013 Hall ......................... B60P 1/43
　　　　　　　　　　　　　　　　　　　　　　414/480

OTHER PUBLICATIONS

TEC Equipment, Publication date N/A, 7 Pages, Saved on Jan. 14, 2022, https://www.tecequipment.com/brand/mack-trucks/mack-md-series/.\*
Amanda Huggett, Mack Medium-Duty: One Year Later, Oct. 13, 2021, Work Truck, 4 Pages, Saved on Jan. 14, 2022, https://www.worktruckonline.com/10152712/mack-medium-duty-one-year-later.\*
Tom Berg, Mack MD6 Delivers Heavy Truck Features, Dec. 22, 2020, Construction Equipment, 8 pages, Saved on Jan. 14, 2022, https://www.constructionequipment.com/mack-md6-delivers-heavy-truck-features.\*
ASTM International, Standard Specification for Steel, Sheet and Strip, Hot-Rolled, Carbon, Structural, High-Strength Low Alloy, High-Strength Low-Alloy with Improved Formability, and Ultra-High Strength, pp. 554-560.

\* cited by examiner

TRANSPORTER HAVING LOWERABLE BED

CROSS REFERENCE TO A RELATED APPLICATION

This application claims the benefit of provisional patent application U.S. App. No. 62/983,202, filed on Mar. 9, 2020 and entitled "TRANSPORTER HAVING LOWERABLE BED", the entire contents of which are hereby expressly incorporated by reference into the present application.

BACKGROUND OF THE INVENTION

1. Field of the Invention

The invention relates to transporters in the form of on-highway trucks and, more particularly, relates to a truck having a bed rear end that can be raised and lowered between loading and transport positions. The invention additionally relates to a method of using such a truck.

2. Discussion of the Related Art

The present invention relates to trucks for equipment transport, and more specifically to a truck having a rear end that can raised and lowered to facilitate the loading and unloading of the truck bed with cargo such as one or more machines. Example of such machines include lawn care equipment, such as riding lawnmowers, and light construction vehicles, such as skid-steer loaders, wheel loaders, and excavators.

Transporters of such machines are confronted with the task of frequently loading and unloading one or a few such machines. For example, a contractor must haul a skid steer loader or a mini-excavator between worksites and/or between a central facility and a worksite. Traditional large tractors and trailers or heavy duty trucks that are equipped with roll-back beds are very costly to purchase and maintain and are not easily drivable to relatively small areas, such as a residential driveway. On the other hand, traditional trailers that can be pulled by a smaller truck are ill-suited for hauling such machines.

These problems are solved in part by the transporters generally disclosed in U.S. Pat. Nos. 7,503,742 and 8,267,466, and previously sold by Versatran, Inc. under the Retriever® trademark. The subject matter of both the '742 patent and the '466 patent are incorporated herein by reference in their entirety. The Retriever truck has a bed that is divided into two to three longitudinally-spaced areas or bed sections connected by a transverse hinge. At least the rear bed section of the bed is constructed in an arch. The rear bed section can be moved through an arc by a frame-mounted elevating device such as a system of air bags. This movement allows the rear end of the rear bed section to be raised for transport or for loading onto an elevated dock, or lowered for loading and unloading directly to the ground. The rear bed section-ramp combination creates a very gentle grade that is low enough to allow most powered machines to readily climb onto the deck without assistance from a winch, thus saving labor and time in loading the truck bed. Even un-propelled machines, such as light towers or other cargo, can winched onto the truck with less effort than otherwise would be required.

The Retriever transporter works very well, but is still relatively heavy when fully-loaded. This weight is of a concern not only for traveling over soft ground, but also because a special commercial driver's license (CDL) is required in the United States to drive any truck having a loaded gross vehicle weight in excess of 26,000 lbs. Many contractors and small business owners do not meet the strict requirements for obtaining a CDL, hindering their access to such transporters.

The need therefore exists to provide a light-weight transporter for cargo, such as turf care machines, and light construction vehicles, such as a skid-steer loaders or mini-excavators.

SUMMARY OF THE INVENTION

In accordance with a first aspect of the invention, a transporter includes a frame supported on wheels, a cab mounted on a front portion of the frame, and a bed mounted on the rear portion of the frame. The bed includes deck plates and supports mounting the deck plates on the frame. At least a rear end portion of the bed is lowerable from a transport or stowed position to a loading position in order reduce the ramp angle required to load the bed from the rear. The bed is sufficiently lightweight that the transporter has rated a hauling capacity of at least 10,000 lbs., despite having a fully loaded gross vehicle weight, i.e., a combined late of truck and cargo loaded to the rated capacity, of no more than 26,000 lbs. At least portions of the bed may be made from a high strength steel (HSS) such as a ASTM A1011/1011M steel having a grade of 80 or higher.

In addition, the transporter may be provided with a ramp having support slats that are inclined relative to the lateral so as to reduce the number of slats required to accommodate a wheeled vehicle of a given wheel size and weight. The slats may be arranged in a herringbone pattern. These slats may be provided on both of the opposed surfaces of the ramp so that machines can be moved across either surface, depending on whether the ramp is deployed on the one hand, or stowed or moved partially to a stowed position, on the other hand.

Also disclosed is a method of operating a transporter. The transporter includes a frame supported on wheels, an operator's cab mounted on a front portion of the frame, and a bed mounted on a rear portion of the frame. The method includes lowering at least a rear end portion of the bed relative to the frame, loading cargo on the bed to form a loaded transporter, the cargo having a mass of at least 10,000 lbs., and the loaded transporter having a gross vehicle weight of no more than 26,000 lbs., and raising the rear end portion of the bed relative to frame. The method further includes legally driving the loaded transporter on a highway in the United States without a CDL license.

The loading step may include moving the cargo along a first support surface of a ramp that extends forwardly from a free end of the ramp to a rear end of the bed. The ramp then is pivoted to a stowed position in which the free end of the ramp rests on the bed and a second support surface of the ramp faces upwardly, the second support surface being disposed opposite the first support surface.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
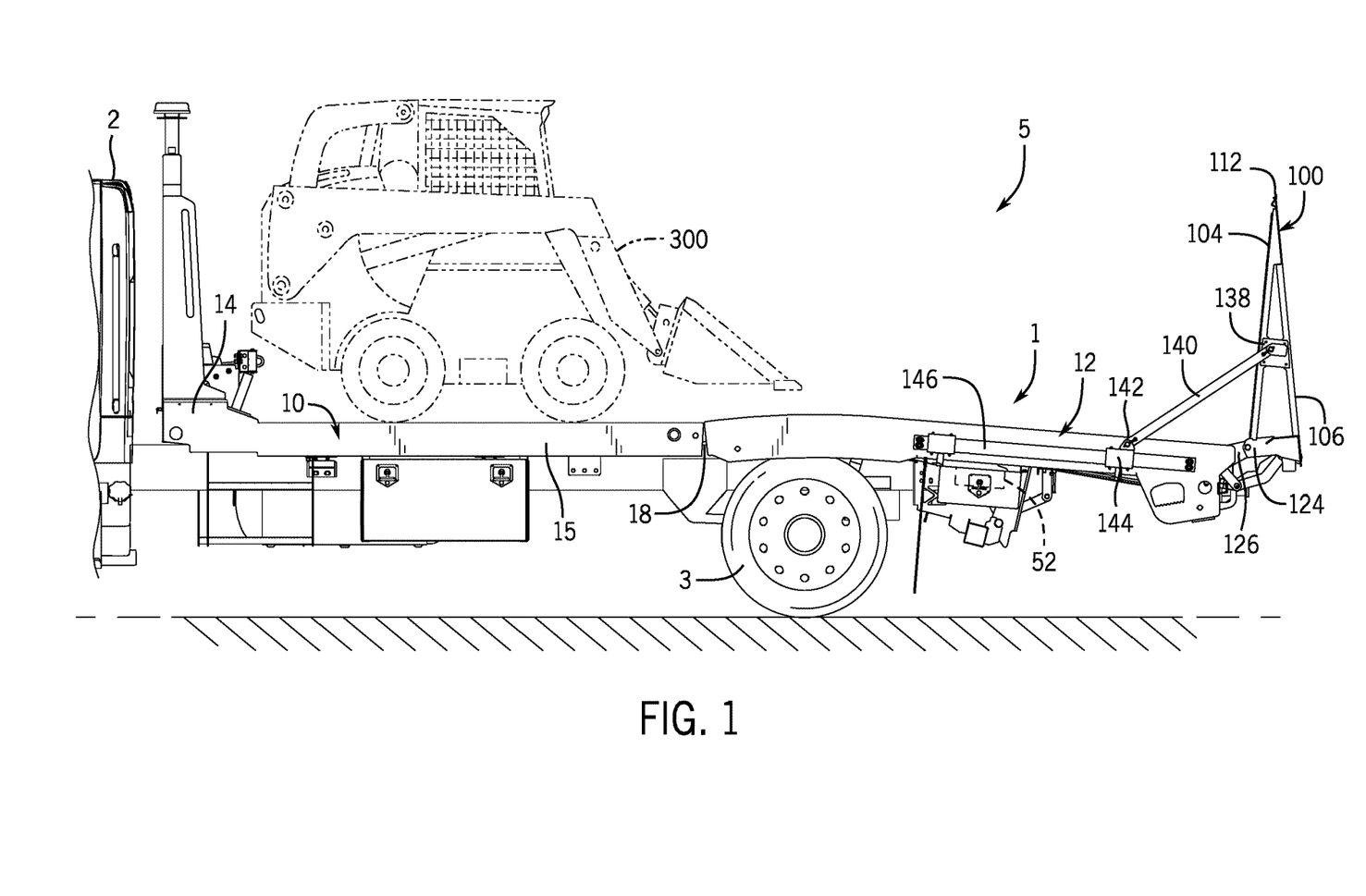
FIG. 1 is a side elevation view of a truck fitted with a truck bed constructed in accordance with the present invention.

Referring initially to FIG. 1, a truck 5 is illustrated having a rear bed 1 and a front operator's cab 2 supported on wheels 3. The truck 5 also includes a drive train (not shown) including an engine, a transmission, etc. The truck 5 is designed for on-highway use and may be a non-CDL truck, having a fully-loaded gross vehicle weight when loaded to the rated capacity of cargo of no more than 26,000 lbs. so as not to require the truck's driver to have a CDL license. The rated cargo capacity of the truck may be at least 10,000 lbs., and more typically up to 12,000 lbs. or even higher.

Still referring to FIG. 1, bed 1 includes a front section 10, a rear section 12, and a front pan 14, all supported on a frame 15. The rear bed section 12 is pivotally coupled to the front bed section 10 by hinges 18 so as to swingable about an arc to raise and lower the rear end of the truck bed 1 between loading and transport positions. The front pan 14 is attached to a front portion 20 of the front bed section 10.

Figure 2:
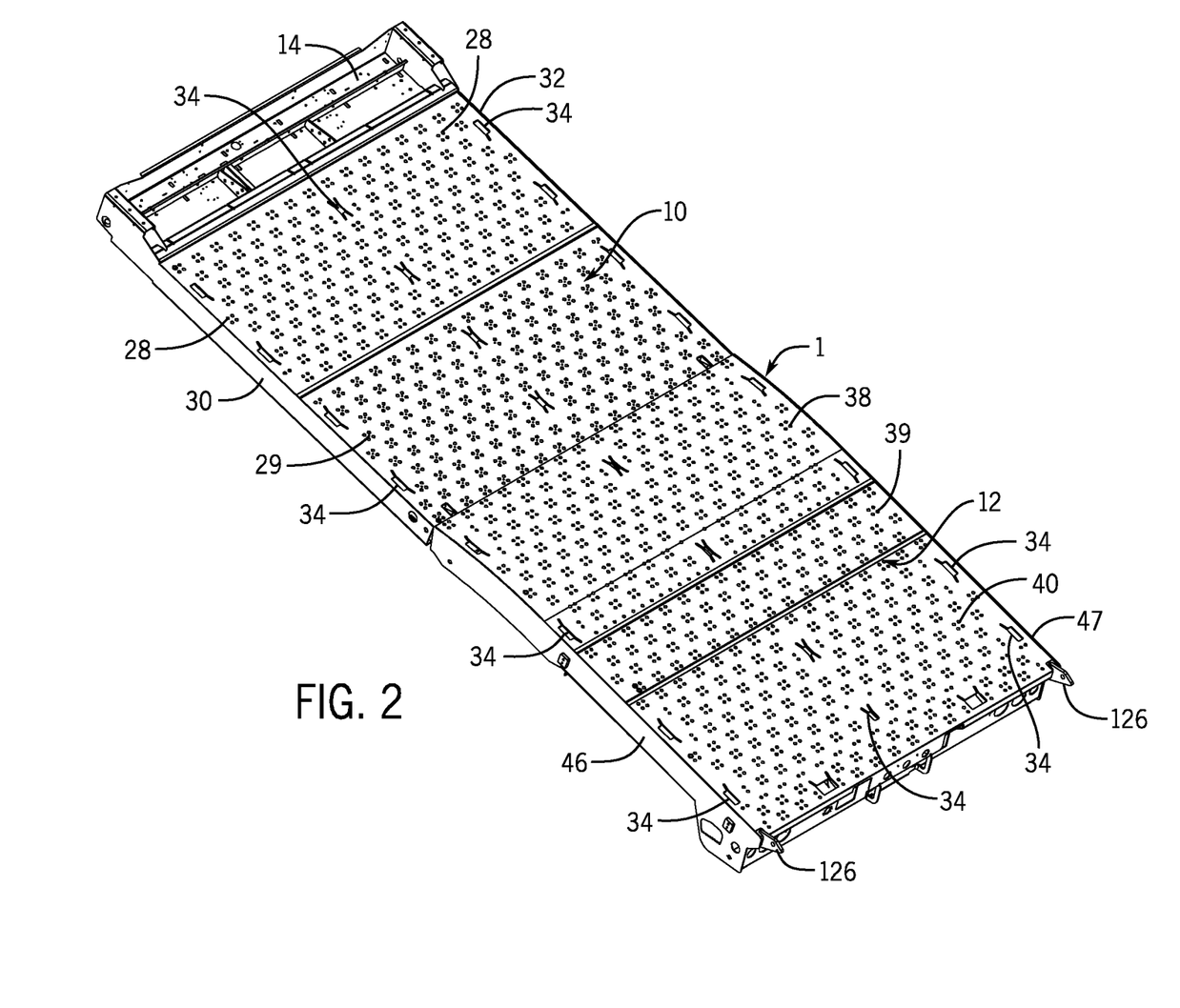
FIG. 2 is a top isometric view of the truck bed of FIG. 1.
Figure 3:
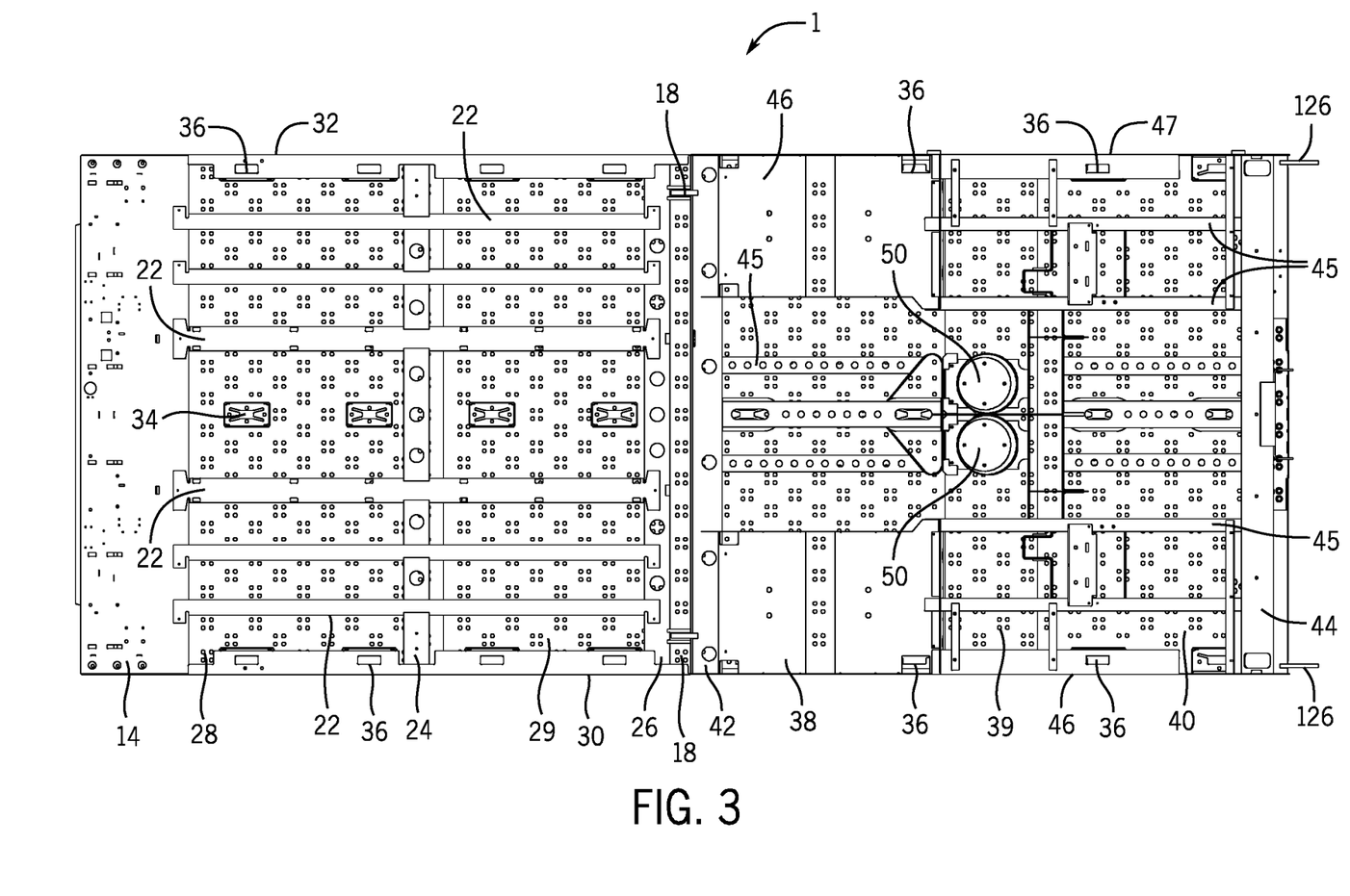
FIG. 3 is a bottom plan view of the truck bed of FIGS. 1 and 2.
Figure 4:
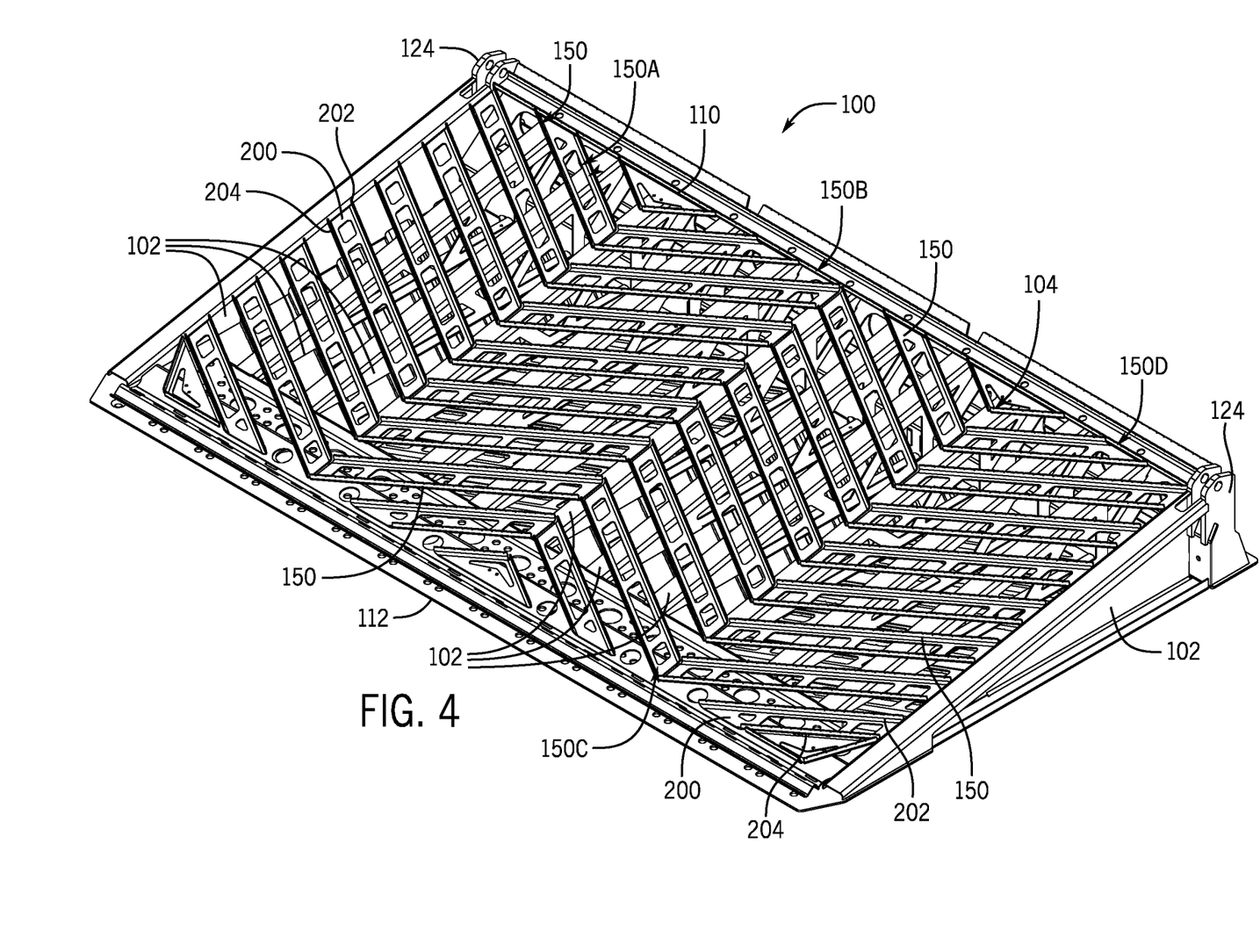
FIG. 4 is an isometric view of a ramp usable with the truck bed of FIGS. 1-3, showing a first, deployed surface of the ramp.
Figure 5:
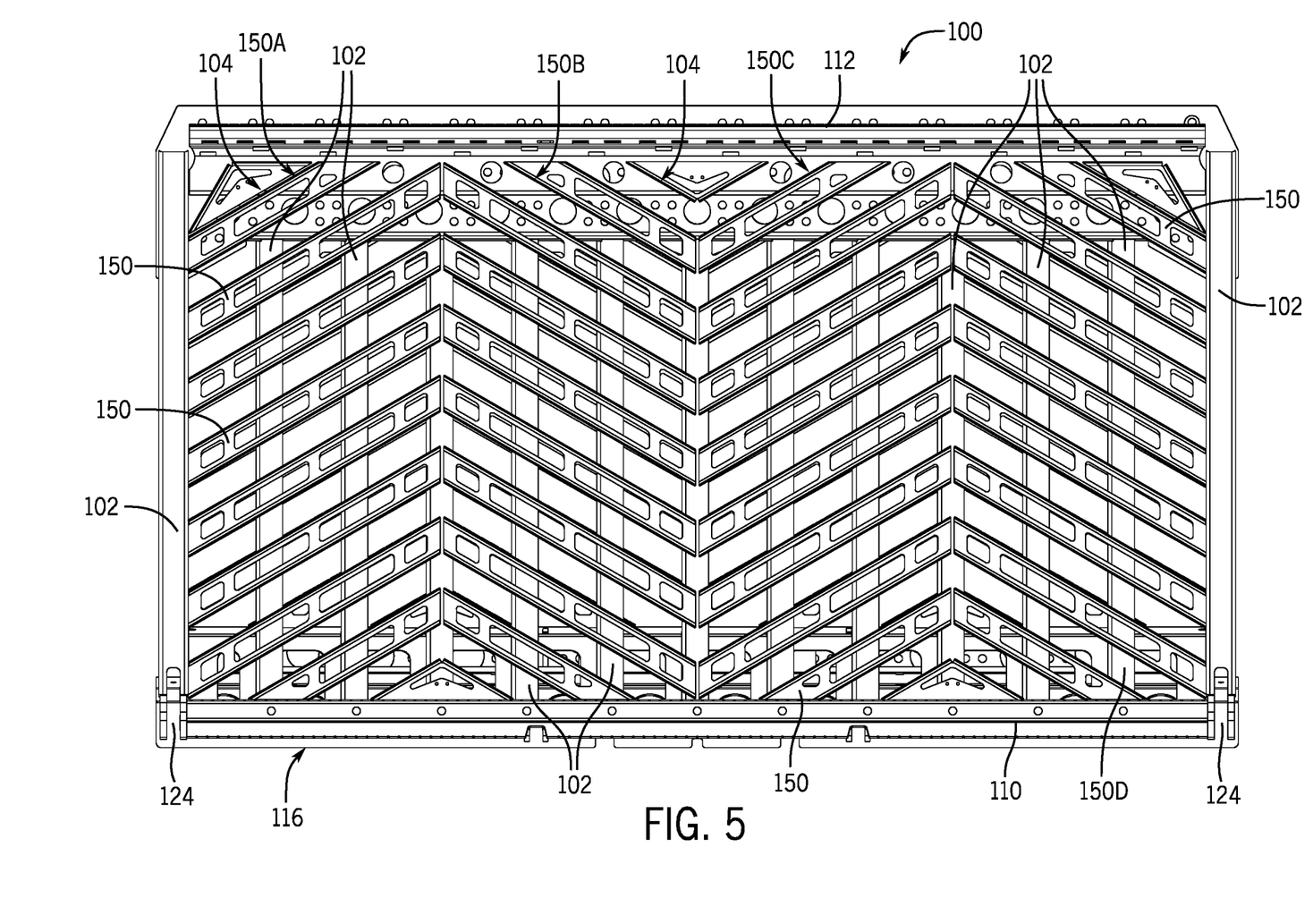
FIG. 5 is a plan view the ramp of FIG. 4, showing the deployed surface of the ramp.
Figure 6:
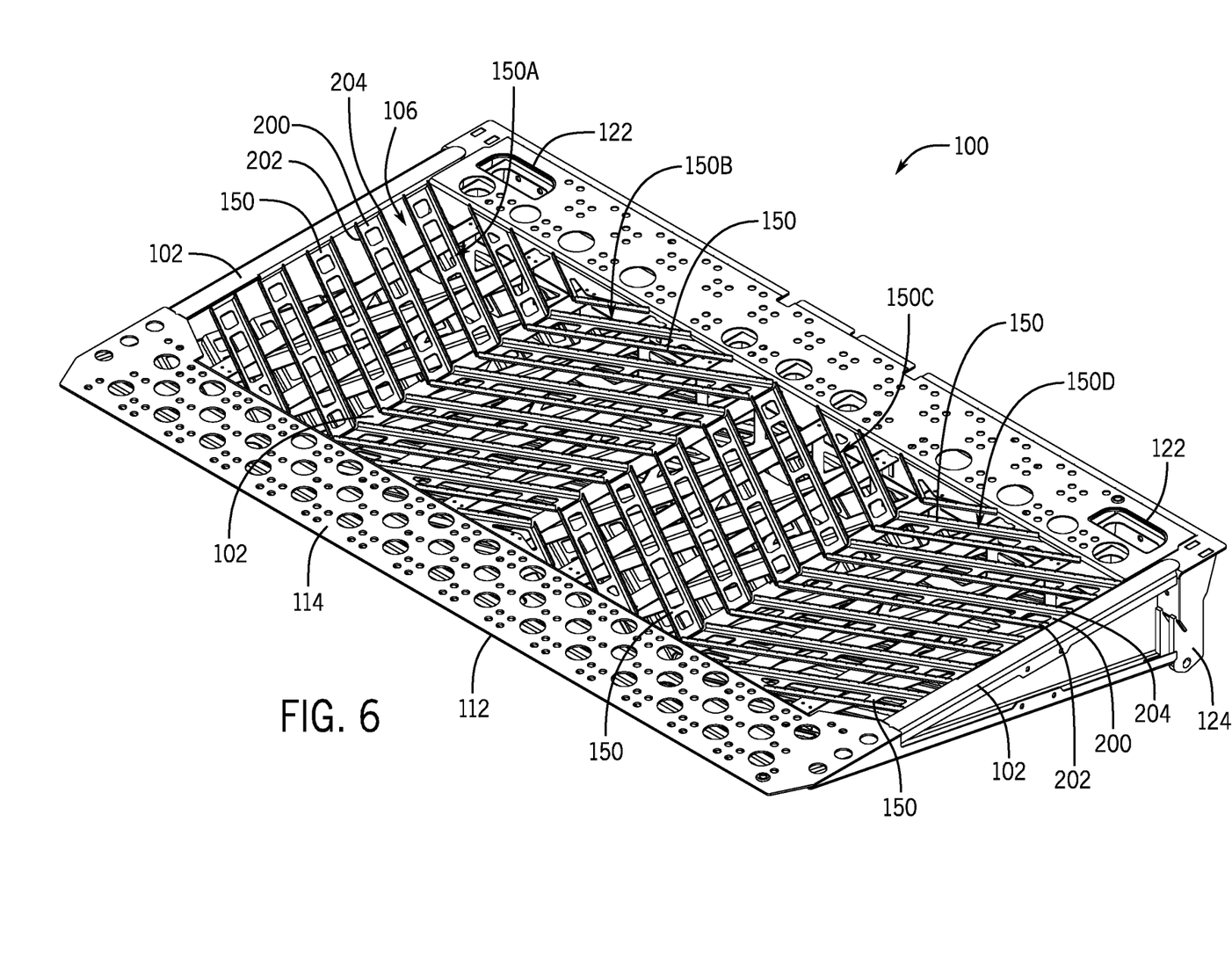
FIG. 6 is an isometric view of the ramp of FIGS. 4 and 5, showing a second, stowed surface of the ramp.
Figure 7:
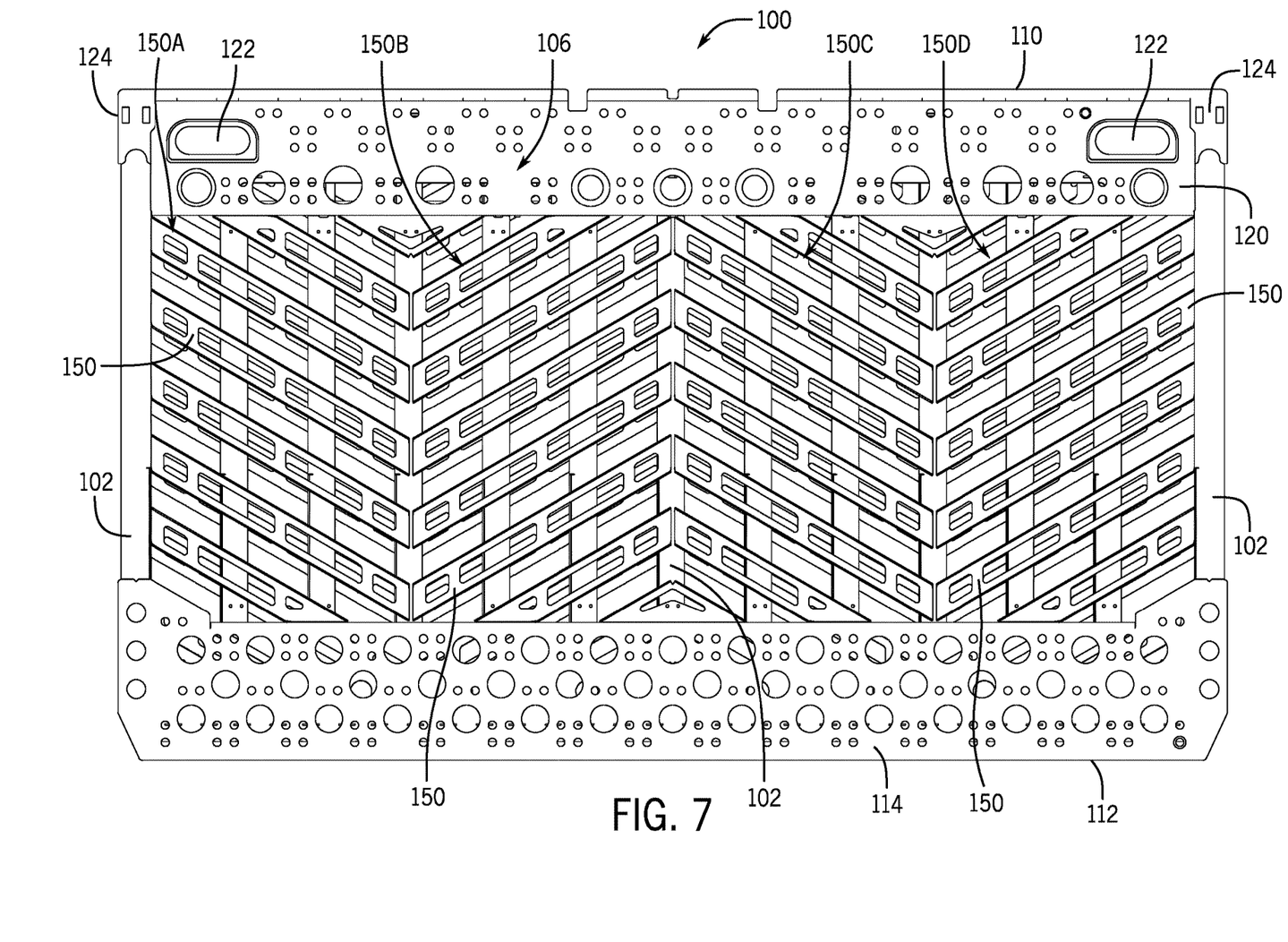
FIG. 7 is a top plan view the ramp of FIGS. 4-6, showing the stowed surface of the ramp.

With reference to FIGS. 2 and 3, the front bed section 10 includes a number of laterally spaced longitudinal supports 22 extending lengthwise of the bed 1. Each support 22 is connected to the pan 14 at front end and to first and second longitudinally spaced cross supports 24 and 26 at its center and rear ends, respectively. Two laterally extending, longitudinally spaced front deck plates 28, 29 are mounted on the supports 22. The deck plates 28, 29 may be apertured to reduce weight and to provide drainage. The height of the supports 22, 24, and 26, and thickness of the deck plates 28 and 29, is reduced when compared to prior art transporters by forming the supports 22, 24, and 26 and deck plates 28, 29 from HSS or another durable, strong, lightweight metal material. The reduced thickness allows a top of the truck bed 1 to be closer to the ground than that of the prior art front section. A distance from a uppermost surface of the prior art truck bed to the ground is about 49 inches, whereas the maximum distance from the top of the truck bed 1 to the ground is about 44 inches or less. Ends of the supports 22 is welded to the supports at its bottom surface and to a bottom of the deck plates 28, 29 at its top surface.

With reference to FIGS. 2 and 3, each of the deck plates 28, 29 includes opposed outer side extensions 30, 32. A portion of the outer and inner side extensions have a C-shape having upper and lower horizontal legs. Tie-down openings 34 may be formed through a top of the deck plates 28, 29, and a plurality of lower tie-down openings 36 may be formed through the lower leg of the outer side extensions 30 and 32.

With reference to FIGS. 2 and 3, the rear bed section 12 includes three longitudinally-spaced, laterally extending rear deck plates 38, 39, and 40. The deck plates 38-40 are mounted on a frame formed by front and rear laterally extending supports 42 and 44 and a plurality of longitudinally extending, laterally spaced supports 45. The deck plates 38-40 may be apertured to reduce weight and to provide drainage. The rear deck plates 38-40 may include opposed outer side extensions 46 and 47. These extensions may be C-shaped to allow for a plurality of tie-down openings 34 to be formed through a top of the deck plates 38, 39, and 40 and a plurality of lower tie-down openings 36 to be formed through a lower leg of the outer side extensions 46 and 47. Each deck plate 38, 39, and 40 and the outer side extensions 46 and 47 may be formed from a single piece of material, preferably HSS. Tops of the longitudinally supports 45 are welded to a bottom of the deck plates 38, 39, and 40, and bottoms of the supports 45 are welded to the lateral supports 42 and 44.

In order to facilitate loading and unloading of the truck 3, the rear bed section 12 can be moved through an arc about transverse hinges 18 by a frame mounted elevating device, such as, for example but not limited to, air bags, a hydraulic cylinder, or a powered screw. The elevating device need not carry a load while the bed 1 is in the transport position. The arc movement allows the rear end of the rear bed section 12 to be either (1) raised for transport or for loading and unloading to an elevated dock, or (2) lowered for loading and unloading directly to the ground. This configuration permits the rear end of the bed 1 to be lowered from an uppermost position that is 30" to 40" above the ground when the airbags are fully inflated to a lowermost position that is about 13" to 17" above the ground when the elevating device is fully retracted, such as when the air bags are fully deflated. It also provides a smooth transition path at the top of the ramp 100 (described below) with no sudden changes in grade.

With reference to FIG. 3, in the illustrated embodiment, the elevating device includes a number of air bags 50 mounted on the underside of the rear deck section 12. Air bag saddles 52 (FIG. 1) are provided on the frame 15 beneath the rear bed section 12 in a mating relationship with the air bags 50. Each air bag 50 may, if desired, be held in place with an air bag retention system as described in the above-referenced U.S. Pat. No. 8,267,466.

In order to reduce the weight of the vehicle without unnecessarily reducing its durability or load carrying capacity, at least the structural portions of the bed 1 are made from HSS or a similar material. These portions include, but may not be limited to, structural components of the front and rear bed sections 10 and 12. These components may include some or all of the deck plates 28, 29, 38, 39, and 40; as well as supports 22, 24, 26, 42, and 44, and 45. Other components, such as the metal components of the airbag retention system, also may be made from this or a similar material. Acceptable materials are relatively strong and durable yet relatively light-weight. ASTM A1011/A1011M steel is one such material. It comes in a variety of grades ranging from Grade 30 (205) to Grade 100 (690). Grades 80 or above, and more typically Grade 100, are suitable. Grade 100 is characterized by a yield strength of 100 ksi and a tensile strength of 110 ksi. Other characteristics of these and other grades are discussed in a specification sheet published by ASTM International under Designation No. A1011/A1011M—09a and entitled "Standard Specification for Steel, Sheet and Strip, Hot-Rolled, Carbon, Structural, High-Strength Low-Alloy, High-Strength Low Allow with Improved Formability and Ultra-High Strength."

Referring now to FIGS. 4-11, a ramp 100 is provided to facilitate loading and unloading of the truck bed 1. The ramp 100 is formed from a strong, durable, lightweight metal such as a Grade 100 HSS. The illustrate ramp 100 extends generally the full width of the truck or about 100" to 110". The ramp 100 has a first end 110 that is mounted on the rear of the truck bed 1 and a second, free end 112. Referring to FIG. 1, the first end 110 of the ramp 100 is pivotally mounted on the rear of the truck bed 1 so as to be swingable through an arc of about 190 degrees from a stowed position, in which a free end 112 rests on the rear of the bed 1, to a deployed position, in which the ramp 100 extends downwardly and rearwardly from the truck bed 1 and the free end 112 rests on the ground, a loading dock, or another surface.

The length of the ramp 100 may vary depending upon the "lowered" height of the rear of the truck bed 1 and the maximum desired incline of the ramp 100. For a truck bed having a rear end lowered height of 13"-17", the ramp 100 should be at least 46" long and, more typically, about 50-60" inches long. This length provides a ramp angle of no more than about 16 deg. when the ramp 100 is deployed, which is considered to be an acceptably shallow incline for climbing by machines that are not designed to climb steep grades.

Referring to FIGS. 4-8, the ramp 100 comprises a number of longitudinal supports 102 and first and second opposed support surfaces 104 and 106 located adjacent opposite sides of the supports 102. Eleven laterally-spaced longitudinal supports 102 are provided in the illustrated embodiment. The first or "deployed" support surface 104 faces upwardly when the ramp 100 is deployed with its free end 112 is resting on the ground or other surface, and the second or "stowed" supports surface 106 faces upwardly when the free end 112 of the ramp 100 rests on the bed 1. The "deployed" support surface 104 thus supports a vehicle being loaded or unloaded from the truck, whereas the "stowed" support surface 106 serves as a support for a vehicle or other cargo that may stowed, at least in part, on the ramp 100 during transport or for cargo transport onto or off from a loading dock.

Figure 10:
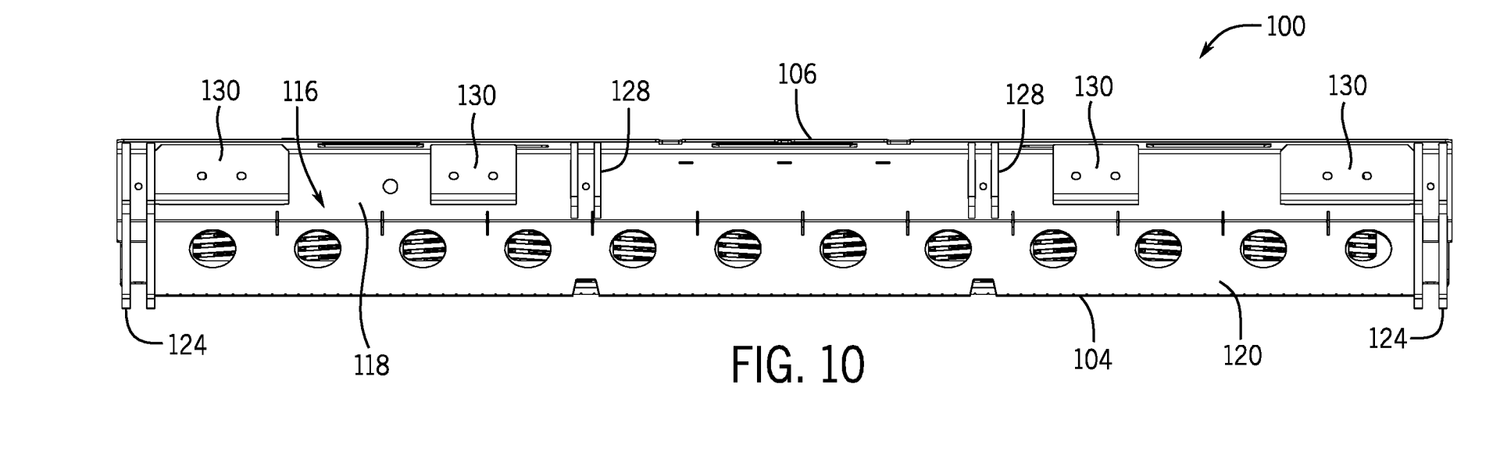
FIG. 10 is a front end view of the ramp of FIGS. 4-9.
Figure 11:
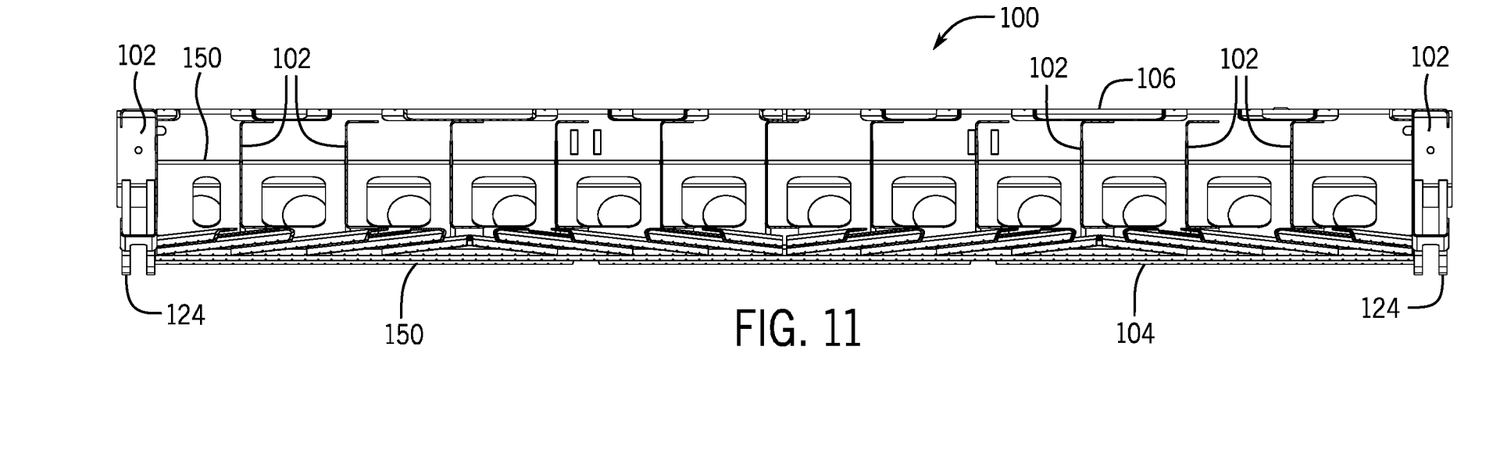
FIG. 11 is a sectional end view of the ramp of FIGS. 4-10.

A ground engaging plate 114 is mounted on the free end 112 of the ramp 100. A truck-bed mounting frame 116 is located on the first end 110 of the ramp 100 for connection to the rear end of the truck bed 1. Referring to FIGS. 10 and 11, The mounting frame 116 includes a generally L-shaped plate having first and second legs 118 and 120 that extend generally vertically and horizontally, respectively, when the ramp 100 is in its deployed position. Taillights (now shown) may be mounted in apertures 122 in the second leg 120 so as to be viewable from behind the truck 5 when the ramp 100 is in a vertical position and the second leg extends 120 generally vertically. A plurality (two in this embodiment) of laterally spaced pivot mounts 124 are located on the front of the vertical leg 118 for pinned connection to corresponding mounts 126 on the rear of the truck bed 1 (see FIG. 1). As best seen in FIG. 10, first and second cylinder mounts 128 are mounted on the vertical leg 118 beneath the pivot mounts 124. Each cylinder mount receives one end of a cylinder (not shown), the opposite end of which is mounted on the rear deck 12 under the bed 1. The cylinders preferably comprises pneumatic cylinders if air bags are employed to raise and lower the bed rear end. These cylinders can be extended and retracted to swing the ramp 100 between its deployed and stowed positions. Bumpers 130 are located adjacent the cylinder mounts 128 for engaging a dock when the ramp 100 is used to transport cargo onto or off from a dock. Referring again to FIG. 1, additional pivot mounts 138 are provided on the sides of the ramp 100. Each pivot mount 138 is connected to the front end of a strut 142, the rear end of which is pivotally connected to a sliding guide 144 mounted on a rail 146 on the side of the bed 1.

Figure 8:
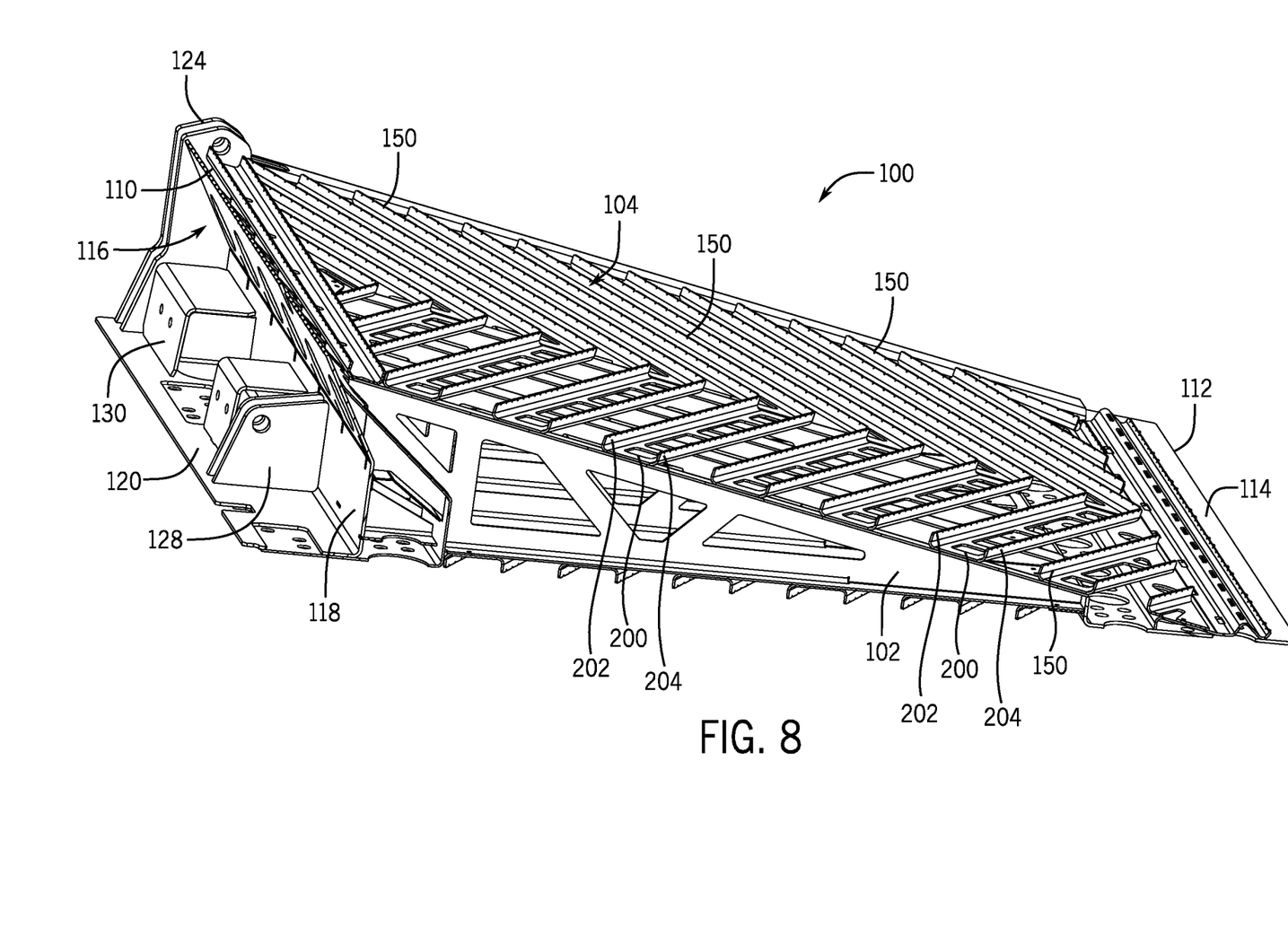
FIG. 8 is isometric side sectional view of the ramp of FIGS. 4-7.
Figure 9:
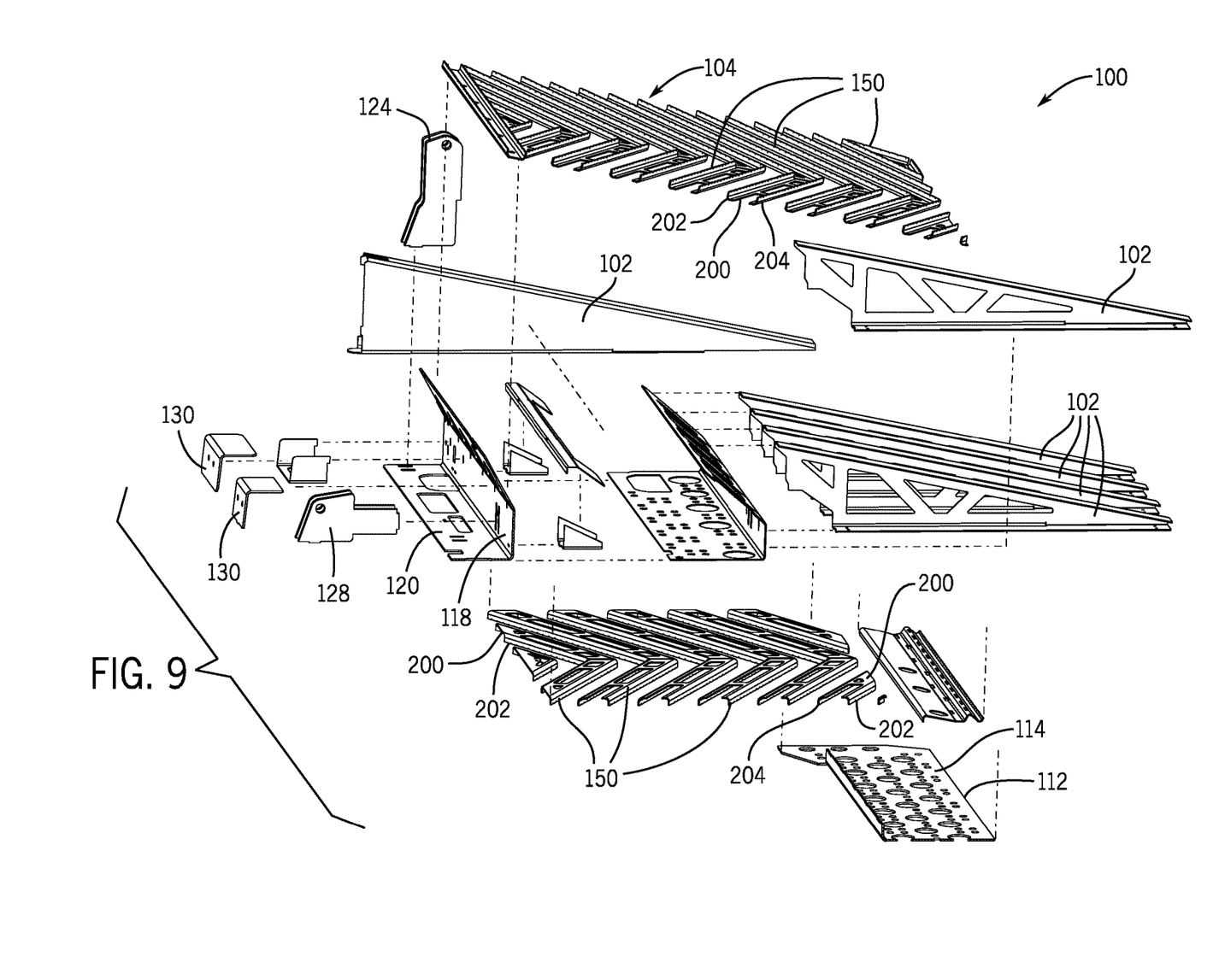
FIG. 9 is an exploded isometric view of the ramp section of FIG. 8.

As best seen in FIG. 8, each longitudinal support 102 is generally triangular in shape when viewed from the side. The angle of this incline equals the above-described ramp 100 angle, or 16 deg. in this embodiment. Referring to FIGS. 4-8, slats 150 are welded to the opposed surfaces of the longitudinal supports 102 to form the first and second support surfaces 104 and 106 described above. Each of the slats 150 may be of identical construction. As best seen in FIG. 9, each slat 150 is generally C-shaped, having a support surface 200 extending in parallel with and welded to the mating surfaces of the longitudinal supports 102 on which the slat is mounted, and first and second legs 202 and 204. The legs 202 and 204 extend perpendicularly from the support surface 200 to free outer ends that, in combination with the outer ends of the legs of the remaining slats, form the support or tire engaging surface of the ramp 100. The support surface 200 of each slat 150 may have openings at intervals to reduce weight without unacceptably reducing strength. The longitudinal supports 102 and ground engaging lower plate 114 have similar openings.

Still referring to FIGS. 4-8, the slats 150 are inclined relative to the lateral rather than extending laterally. Orientating the slats in this manner reduces the number of slats required to provide a given degree of support, reducing the weight of the ramp 100. In the present case, the slats 150 forming each surface 104 and 106 are arranged in a herringbone pattern. The slats 150 on each side of the ramp 100 are provided in four sets 150A-150D, with the slats 150 of each set being equally-spaced from one another and being parallel to each other. Each slat 150 extends at least partially across three longitudinal supports 102. For example, proceeding from left to right in FIG. 5, the slats of the first and third sets 150A and 150C are inclined at a positive angle relative to the lateral, and the slats of the second and fourth sets 150B and 150D are inclined at a complimentary negative angle relative to the lateral. This angle, and the spacing between slats, may vary with application, designer preference, etc. For applications in which the truck 5 is optimized to transport utility machines such as riding or walk behind commercial lawnmowers, skid-steer loaders, etc., the slats 150 may extend at an angle of 25 to 40 deg., and more typically 30 deg. The slat-to-slat spacing may be 1" to 4" and more typically 3". Each slat 150 is 1" to 4" wide, and more typically 3", wide. Each slat 150 may have treads or similar features for improved traction.

The ramp 100 of this embodiment is a unitary structure extending essentially the entire width of the truck bed 1. However, two spaced ramps also could be provided in place of the single ramp 100. In this case, the center-to center spacing of the ramps may equal the typical wheel spacing of machines being transported.

In use, to load cargo such a skid loader 300 onto the truck 5, the truck 5 is parked, and the air bags 50 are deflated to lower the rear end of the truck bed 1 relative to the frame 15. The ramp 100 then is swung about the hinge points 124 under power of the pneumatic cylinders from the stowed position, in which the deployed surface 104 rests on the rear of the truck bed and the stowed surface 106 faces upwardly, to its deployed position, in which the free end 112 of the ramp 100 rests on the ground, the deployed surface 104 faces upwardly, and the stowed surface 106 faces downwardly. A machine can then be driven up the ramp 100 onto the truck bed 1 or, if the machine or other cargo is not self-propelled, winched up the ramp 100. The relatively-shallow 16 degree grade provided by the ramp 100 permits most self-propelled vehicles to be driven up the ramp 100 without the aid of a winch. The ramp 100 can then be swung back to its stowed position, and the air bags 50 can be inflated to raise the rear of the truck bed 1 to its transport position. If desired, the machine can be driven rearwardly at least part way up the ramp 100 to make room in front of the machine for other equipment to be transported. If the truck 5 is backed up against a dock, the air bags 50, or dock legs, can be adjusted to level the top of the ramp 100 with the dock, permitting the machine or other cargo to be loaded onto the dock from the rear end of the ramp.

The process is simply repeated to unload the truck bed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A transporter comprising:
   (A) a frame supported on wheels;
   (B) a cab mounted on a front portion of the frame; and
   (C) a bed mounted on the rear portion of the frame, the bed including deck plates and supports mounting the deck plates on the frame, at least a rear end portion of the bed being raiseable and lowerable relative to the frame, wherein the transporter has a hauling capacity of at least 10,000 lbs. and a fully-loaded gross vehicle weight of no more than 26,000 lbs., wherein the deck plates and at least some of the supports of the bed are made from a high strength steel (HSS) having a grade of 80 or higher.

2. The transporter of claim 1, wherein the bed includes a front portion and a rear portion, the rear portion being swingable about an arc relative to the front portion to raise and lower the rear end of the rear portion relative to the frame.

3. The transporter of claim 2, further comprising airbags disposed between the frame and the bed and being selectively inflatable to raise at least a rear end portion of the bed relative to the frame.

4. The transporter of claim 1, further comprising a ramp that is attached to the rear portion of the bed, the ramp having longitudinally extending supports and slats that are mounted on the supports and that extend at an acute angle relative to the lateral.

5. The transporter of claim 4, wherein the slats are arranged in a herringbone pattern.

6. The transporter of claim 4, wherein the slats form opposed first and second opposed support surfaces of the ramp, and wherein the ramp is swingable about the truck bed from a deployed position in which a free end of the ramp engages a surface behind the truck bed and the first support surface of the ramp faces upwardly, to a stowed position in which the free end of the ramp rests on the truck bed and the second support surface of the ramp faces upwardly.

7. The transporter of claim 4, wherein at least portions of the ramp are made from a ASTM A1011/1011M steel having a grade of 80 or higher.

8. A truck comprising:
   (A) a frame supported on wheels;
   (B) an operator's cab mounted on a front portion of the frame;
   (C) a bed mounted on the rear portion of the frame, the bed including deck plates and deck plate supports mounting the deck plates on the frame, wherein the bed includes a front portion and a rear portion, the rear portion being swingable about an arc to raise and lower the rear end of the rear portion relative the frame; and
   (D) a ramp attached to the rear portion of the bed, the ramp having longitudinally extending supports and slats that are mounted on the supports and that extend at an acute angle relative to the lateral, wherein the truck has a hauling capacity of at least 10,000 lbs. and a fully loaded gross vehicle weight of no more than 26,000 lbs., wherein at least the deck plates, the deck plate supports, the slats, and the slat supports are made from a ASTM A1011/1011M steel having a grade of 80 or higher.

9. The truck of claim 8, further comprising airbags disposed between the frame and the bed and being selectively inflatable to raise at least a rear end portion of the bed relative to the frame.

10. The truck of claim 8, wherein the slats form opposed first and second opposed support surfaces of the ramp, and wherein the ramp is swingable about the truck bed from a deployed position in which a free end of the ramp engages a surface behind the truck bed and the first support surface of the ramp faces upwardly, to a stowed position in which the free end of the ramp rests on the truck bed and the second support surface of the ramp faces upwardly.

11. The transporter of claim 1, wherein the HSS is a ASTM A1011/1011M steel.

12. The truck of claim 8, wherein the slats are arranged in a herringbone pattern.

13. A method of operating a transporter, the transporter comprising a frame supported on wheels, an operator's cab mounted on a front portion of the frame, and a bed mounted on a rear portion of the frame, the bed having deck plates and deck plate supports constructed from a high strength steel having a grade of 80 or higher, the method comprising:
   (A) lowering at least a rear end portion of the bed relative to the frame;
   (B) loading cargo onto the bed to form a loaded transporter, the cargo having a mass of at least 10,000 lbs., and the loaded transporter having a gross vehicle weight of no more than 26,000 lbs.;
   (C) raising the rear end portion of the bed relative to frame; and
   (D) legally driving the loaded transporter on a highway in the United States without a CDL license.

14. The method of claim 13, wherein the loading step comprises moving the cargo along a first support surface of a ramp that extends forwardly from a free end of the ramp to a rear end of the bed, and further comprising pivoting the ramp to a stowed position in which the free end of the ramp rests on the bed and a second support surface of the ramp faces upwardly, the second support surface being disposed opposite the first support surface.

15. The method of claim 14, wherein the free end of the ramp rests on one of the ground and a loading dock during the loading step.

16. The method of claim 14, wherein the bed includes deck plates and deck plate supports mounting the deck plates on the frame, wherein the ramp has longitudinally extending supports and slats that are mounted on the supports and that extend at an acute angle relative to the lateral, and wherein at least the deck plates, the deck plate supports, the slats, and the slat supports are made from a ASTM A1011/1011M steel having a grade of 80 or higher.

17. The method of claim 13, wherein the bed includes deck plates and deck plate supports mounting the deck plates on the frame, and wherein at least the deck plates and the deck plate supports are made from a ASTM A1011/1011M steel having a grade of 80 or higher.

18. A truck comprising:
(A) a frame supported on wheels;
(B) an operator's cab mounted on a front portion of the frame;
(C) a bed mounted on the rear portion of the frame, the bed including deck plates and deck plate supports mounting the deck plates on the frame, wherein the bed includes a front portion and a rear portion, the rear portion being swingable about an arc relative to the front portion to raise and lower the rear end of the rear portion relative the frame;
(D) airbags disposed between the frame and the bed and being selectively inflatable to raise at least a rear end portion of the bed relative to the frame; and
(E) a ramp attached to the rear portion of the bed, the ramp having longitudinally extending supports and slats that are mounted on the supports and that extend at an acute angle relative to the lateral,
wherein the truck has a hauling capacity of at least 10,000 lbs. and a fully loaded gross vehicle weight of no more than 26,000 lbs., wherein at least the deck plates, the deck plate supports, the slats, and the slat supports are made from a high strength steel having a grade of 80 or higher.

19. The truck of claim 18, wherein the slats are arranged in a herringbone pattern and form opposed first and second opposed support surfaces of the ramp, and wherein the ramp is swingable about the truck bed from a deployed position in which a free end of the ramp engages a surface behind the truck bed and the first support surface of the ramp faces upwardly, to a stowed position in which the free end of the ramp rests on the truck bed and the second support surface of the ramp faces upwardly.

* * * * *